(12) United States Patent
Lee et al.

(10) Patent No.: US 11,535,331 B2
(45) Date of Patent: Dec. 27, 2022

(54) BICYCLE MOUNTING MECHANISM AND BATTERY BOX ASSEMBLY

(71) Applicant: DONGGUAN HONG LIN INDUSTRIAL CO., LTD., Dongguan (CN)

(72) Inventors: Ming-Hsien Lee, Dongguan (CN); Yao-Chin Yang, Dongguan (CN); Wen-Hua Xiong, Dongguan (CN)

(73) Assignee: DONGGUAN HONG LIN INDUSTRIAL CO., LTD, Dongguan (CN)

( * ) Notice: Subject to any disclaimer, the term of this patent is extended or adjusted under 35 U.S.C. 154(b) by 1155 days.

(21) Appl. No.: 16/117,694

(22) Filed: Aug. 30, 2018

(65) Prior Publication Data

US 2019/0061863 A1    Feb. 28, 2019

(30) Foreign Application Priority Data

Aug. 30, 2017  (TW) .................................. 106129517
Aug. 30, 2017  (TW) .................................. 106212840

(51) Int. Cl.
*B62K 19/40*    (2006.01)
*B62M 6/90*    (2010.01)
(Continued)

(52) U.S. Cl.
CPC ............. *B62K 19/40* (2013.01); *B62H 5/001* (2013.01); *B62J 7/04* (2013.01); *B62J 43/20* (2020.02);
(Continued)

(58) Field of Classification Search
CPC .......... B62K 19/40; B62K 19/46; B62J 43/20; B62J 7/04; B62J 43/30; B62J 45/00;
(Continued)

(56) References Cited

U.S. PATENT DOCUMENTS 1,030,844 A * 6/1912 Howell ...................... B62J 1/14
224/415
4,030,648 A * 6/1977 Johnson ..................... B62J 7/04
D6/333

(Continued)

FOREIGN PATENT DOCUMENTS

CN    104411575 B    2/2017

*Primary Examiner* — Jacob B Meyer
*Assistant Examiner* — Conan D Duda
(74) *Attorney, Agent, or Firm* — Muncy, Geissler, Olds & Lowe, P.C.

(57) ABSTRACT

A bicycle mounting mechanism and battery box assembly installed in a bicycle frame of a bicycle is provided to include a battery box and a mounting mechanism. The battery box includes an abutment recess and an opening. The mounting mechanism includes a grip and a locating component unit being connected to the bicycle frame and defining therein an accommodation chamber for accommodating the battery box. The grip is pivotally connected to the locating component unit and includes an abutment end portion and a push end portion. The abutment end portion is capable of inserting into the accommodation chamber and in engagement with the opening with a rotating of the grip. The push end portion is capable of inserting into the accommodation chamber and abuts against the abutment recess with a further rotating of the grip.

13 Claims, 21 Drawing Sheets

(51) Int. Cl.
  *B62H 5/00*        (2006.01)
  *B62J 7/04*        (2006.01)
  *B62J 43/20*       (2020.01)
  *B62J 6/00*            (2020.01)
  *B62J 45/00*           (2020.01)
  *B62J 43/13*           (2020.01)
  *B62J 43/30*           (2020.01)

(52) U.S. Cl.
  CPC .................. *B62M 6/90* (2013.01); *B62J 6/00* (2013.01); *B62J 43/13* (2020.02); *B62J 43/30* (2020.02); *B62J 45/00* (2020.02)

(58) Field of Classification Search
  CPC ..... B62J 43/13; B62J 6/00; B62J 7/02; B62H 5/001; B62M 6/90
  See application file for complete search history.

(56) References Cited

U.S. PATENT DOCUMENTS

| | | | | |
|---|---|---|---|---|
| 4,154,382 A * | 5/1979 | Blackburn | | B62J 7/04 224/450 |
| 4,266,703 A * | 5/1981 | Litz | | B62J 7/04 224/418 |
| 4,339,060 A * | 7/1982 | Braida, Jr. | | B62J 11/19 224/428 |
| 4,350,361 A * | 9/1982 | Fujii | | B62J 7/04 224/450 |
| 4,383,625 A * | 5/1983 | Kiang | | B62J 7/04 224/450 |
| 4,562,944 A * | 1/1986 | Jackson | | B62J 7/08 224/438 |
| 4,666,071 A * | 5/1987 | Irwin | | B62J 7/04 224/450 |
| 5,090,717 A * | 2/1992 | Belka | | B62J 7/04 280/304.5 |
| 5,251,796 A * | 10/1993 | Shelhart | | B62J 11/00 224/450 |
| 5,257,727 A * | 11/1993 | Chen | | B62J 7/04 224/450 |
| 5,271,540 A * | 12/1993 | Katz | | B62J 9/27 224/430 |
| 5,411,190 A * | 5/1995 | Kortenbrede | | B62J 7/04 224/452 |
| 5,551,609 A * | 9/1996 | Best | | B62J 7/04 224/462 |
| 5,649,657 A * | 7/1997 | Chuang | | B62J 7/00 224/430 |
| 5,803,329 A * | 9/1998 | Weissenberger | | B62J 7/04 224/450 |
| 5,931,361 A * | 8/1999 | Schwimmer | | B62J 7/04 224/418 |
| 6,285,160 B1 * | 9/2001 | Tsai | | B62K 3/002 320/112 |
| 6,398,247 B1 * | 6/2002 | Kuo | | B62J 7/04 224/427 |
| 6,817,501 B1 * | 11/2004 | Rogers | | B62J 7/04 224/431 |
| 8,857,686 B1 * | 10/2014 | Vitanza | | B62J 7/04 224/454 |
| 2006/0088758 A1 * | 4/2006 | Wu | | B62M 6/90 429/97 |
| 2006/0138185 A1 * | 6/2006 | Lien | | B62J 7/04 224/427 |
| 2006/0196322 A1 * | 9/2006 | Chuang | | B62K 19/40 81/177.85 |
| 2006/0208453 A1 * | 9/2006 | Ishikawa | | B62M 6/90 280/288 |
| 2008/0011031 A1 * | 1/2008 | Chuang | | B62J 7/04 70/233 |
| 2008/0111344 A1 * | 5/2008 | Chuang | | B62J 9/23 280/288.4 |
| 2008/0179473 A1 * | 7/2008 | Chuang | | B62J 15/02 24/522 |
| 2008/0296329 A1 * | 12/2008 | Guckes | | B62J 7/04 224/412 |
| 2009/0001115 A1 * | 1/2009 | Vongnaraj | | B62J 7/04 224/452 |
| 2009/0159626 A1 * | 6/2009 | Hoidal | | B62J 7/04 224/456 |
| 2009/0261134 A1 * | 10/2009 | Tetsu | | B62M 6/90 224/412 |
| 2010/0025137 A1 * | 2/2010 | Mughal | | B62M 6/90 429/96 |
| 2010/0072239 A1 * | 3/2010 | Hsu | | B62J 11/05 224/451 |
| 2010/0243691 A1 * | 9/2010 | Salisbury | | B62J 7/04 224/555 |
| 2010/0275564 A1 * | 11/2010 | Baetica | | A01D 34/58 56/11.9 |
| 2011/0240391 A1 * | 10/2011 | Bonneville | | B60L 50/52 180/220 |
| 2012/0061434 A1 * | 3/2012 | Giguere | | B62J 7/04 224/412 |
| 2012/0145759 A1 * | 6/2012 | Shih | | B62J 7/04 224/412 |
| 2012/0187167 A1 * | 7/2012 | Salisbury | | B62K 11/00 29/426.1 |
| 2012/0205411 A1 * | 8/2012 | Lindloff | | B62J 9/23 29/428 |
| 2013/0004818 A1 * | 1/2013 | Honda | | B62M 25/08 429/98 |
| 2013/0216885 A1 * | 8/2013 | Kawatani | | H01M 50/20 429/100 |
| 2013/0277132 A1 * | 10/2013 | Kawatani | | B62J 43/20 180/220 |
| 2013/0280572 A1 * | 10/2013 | Kawatani | | B60L 53/80 429/100 |
| 2014/0329134 A1 * | 11/2014 | Lang | | B62M 6/90 429/156 |
| 2015/0114734 A1 * | 4/2015 | Ogawa | | B62M 6/90 180/68.5 |
| 2015/0158551 A1 * | 6/2015 | Ogawa | | B62M 6/90 180/207.3 |
| 2015/0266543 A1 * | 9/2015 | Marioni | | B60L 50/20 180/207.3 |
| 2017/0297652 A1 * | 10/2017 | Yoshiie | | B60L 50/20 |
| 2018/0111652 A1 * | 4/2018 | Halevi | | B62H 5/001 |
| 2018/0229803 A1 * | 8/2018 | Wesling | | B62M 9/132 |
| 2018/0257737 A1 * | 9/2018 | Komatsu | | B62M 9/132 |
| 2021/0394865 A1 * | 12/2021 | Wesling | | B62M 9/132 |

* cited by examiner

BICYCLE MOUNTING MECHANISM AND BATTERY BOX ASSEMBLY

BACKGROUND OF THE INVENTION

1. Field of the Invention

The present invention relates to bicycle mounting mechanism and battery box assembly, and more particularly to a bicycle mounting mechanism and battery box assembly that facilitates mounting and dismounting the battery box.

2. Description of the Related Art

With the development of electrical bicycles, more and more bicycle accessories, such as LED lights and wheel motors are driven by battery power. However, the battery may run out of electricity and need to recharge, so the bicycle rider needs to remove the battery from the bicycle for a replacement.

It is known that CN patent publication number CN104411575B discloses a bicycle battery mounting structure. As illustrated in FIG. 2 in the drawings, this bicycle battery mounting structure comprises a mounting support 16, a storage battery 13, and a supplementary dismounting bar 24. The mounting support 16 is mounted to the down tube 8. The storage battery 13 is detachably mounted on the mounting support 16. The supplementary dismounting bar 24 is mounted on the mounting support 16 at one lateral side of the storage battery 13. A user can bias the supplementary dismounting bar 24 to push the storage battery 13 toward a dismounting direction A, allowing removal of the storage battery 13 from the mounting support 16.

In the aforesaid patent, the supplementary dismounting bar 24 is only adapted for pushing out the storage battery 13, but not for positioning or locking the storage battery 13, and thus, the storage battery 13 cannot be effectively and accurately set in position. Therefore, the aforesaid patent is still not satisfactory in function and has room for improvement.

SUMMARY OF THE INVENTION

The present invention has been accomplished under the circumstances in view. It is an object of the present invention to provide a bicycle mounting mechanism and battery box assembly for installation in a bicycle frame of a bicycle. The assembly comprises a battery box and a mounting mechanism. The battery box comprises an abutment recess and an opening located on an outer surface thereof. The mounting mechanism comprises a locating component unit connected to the bicycle frame, and a grip pivotally connected to the locating component unit. The locating component unit comprises an accommodation chamber for accommodating or disassembling the battery box. The grip comprises an abutment end portion and a push end portion. The abutment end portion is capable of inserting into the accommodation chamber and in engagement with the opening with a rotating of the grip. The push end portion is capable of inserting into the accommodation chamber and abutting against the abutment recess with a further rotating of the grip.

The present invention has the beneficial effects as follows:

(1) The user can rotate the grip into the accommodation chamber to force the abutment end portion into abutment against the inner wall of the opening, effectively and accurately positioning the battery box upon installation of the battery box in the locating component unit.

(2) The user can easily grasp the grip to push the push end portion against the abutment recess of the battery box, allowing removal of the battery box from the locating component unit.

In one aspect of the present invention, the assembly of the present invention is applicable to general bicycle, a mountain bike, or an electric bicycle with auxiliary driving power.

In another aspect of the present invention, the opening cuts through the opposing top and bottom sides of the battery box so that the user can upwardly grasp the opening of the battery box to remove the battery box from the locating component unit.

In still another aspect, the relative positioning relationship between the grip and the battery box is not limited to the present application. For example, the grip can be designed to be rotatable between a close position and an open position. When the grip rotates to the close position, the abutment end portion is disposed in the opening, and the push end portion does not contact the abutment recess. When the grip rotates to the open position, the abutment end portion is disposed outside the opening, and the push end portion contacts the abutment recess.

Preferably, the locating component unit further comprises two support members respectively connected to and backwardly extended from the seat tube of the bicycle frame, and a top cover mounted on the two support members. Further, the accommodation chamber is jointly defined by the two support members and the top cover. Further. the grip is pivotally connected to the top cover.

In still another aspect, the top cover comprises a holder block. The grip further comprises a pivot-connection portion pivotally connected to the holder block, and a plug hole. The mounting mechanism further comprises a switch device movably mounted on the holder block. The switch device comprises a toggle key, and a pin connected to the toggle key and movable with the toggle key to plug into the plug hole.

Preferably, to facilitate returning the toggle key, the holder block further comprises a spring mounting groove, and the switch device further comprises a compression spring that has two opposite ends thereof respectively stopped against the pin and an end wall of the spring mounting groove.

Preferably, to facilitate automatically opening of the grip and to facilitate grasping of the grip by the user to dismount the battery box, a torsion spring may be used to mount t the pivot-connection portion of the grip. The torsion spring has two opposing end pieces respectively stopped against the grip and the holder block. By means of the elastic restoring force of the torsion spring, the grip can be opened efficiently.

Preferably, the grip further comprises a flexible pad mounted on the abutment end portion. The flexible pad is made of a soft material that is elastically deformable. Thus, when the abutment end portion of the grip is stopped against the peripheral wall of the opening of the battery box, the flexible pad effectively provides a buffering effect. Through the deformation of the flexible pad, the battery box can be positioned more accurately.

Preferably, the grip further comprises a grip body. The pivot-connection portion is disposed relatively close to the abutment end portion and the push end portion and relatively far from the grip body.

To achieve this and other objects, the present invention further provides a bicycle luggage carrier and battery box assembly. It is mounted to a seat tube of a bicycle. The assembly comprises a luggage carrier and a battery box. The luggage carrier comprises a locating component unit and at least one sliding rail. The locating component unit comprises a first support member and a second support member respectively connected to and backwardly extended from the seat tube of the bicycle. The at least one sliding rail is mounted to the locating component unit. The battery box is mounted in the locating component unit, and it comprises at least one sliding coupling structure respectively slidably coupled to the least one sliding rail.

The present invention further provides a bicycle luggage carrier, which is mounted to a seat tube of a bicycle for mounting an object. The luggage carrier comprises a locating component unit that comprises a first support member and a second support member respectively connected to and backwardly extended from the seat tube of the bicycle, and at least one sliding rail mounted at the locating component unit for connection the object.

The present invention has the following beneficial effects:

(1) Through the structural design of the luggage carrier, the user can easily hold the battery box to pull the battery box out of the locating component unit along the sliding rails (or to install the battery box in the locating component unit), facilitating mounting and dismounting.

(2) The installation of the battery box does not require precision alignment, providing a large faulty space and facilitating quick installation.

(3) Since the first support member and the second support member are both connected to the seat tube, the invention provides a cantilever design without a bottom, effectively reducing the heavy sense visually.

Other advantages and features of the present invention will be fully understood by reference to the following specification in conjunction with the accompanying drawings, in which like reference signs denote like components of structure.

DETAILED DESCRIPTION OF THE INVENTION

The technical features of the present invention will now be described by way of three embodiments with reference to the annexed drawings. Further, to facilitate explanation of the following embodiments of the present invention, the assembly 10 is mounted at a back side of a seat tube 3 (see FIG. 1), such that the heading direction of the bicycle 1 is directed to the front direction of the assembly 10.

Figure 1:
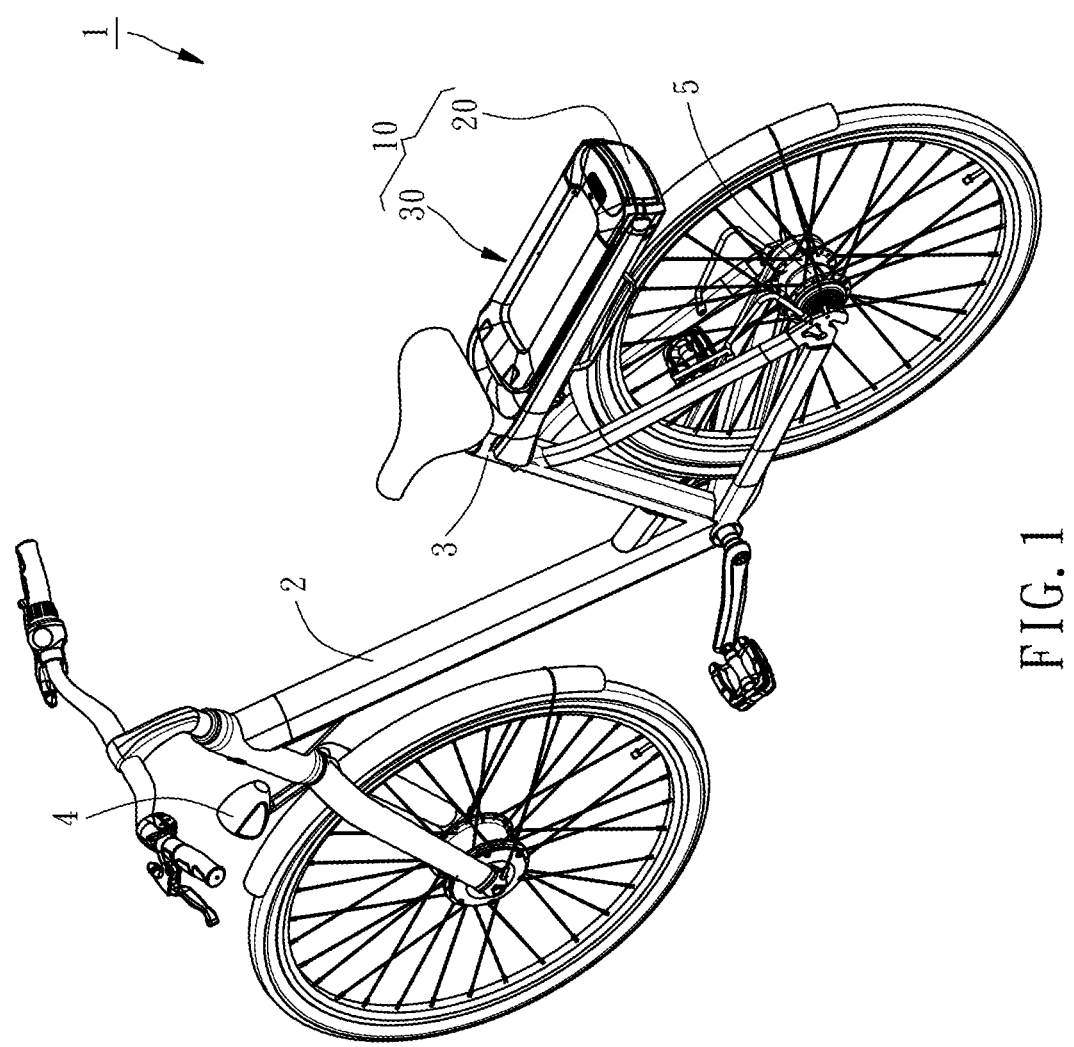
FIG. 1 is an oblique top elevational view of a bicycle in accordance with a first embodiment of the present invention.
Figure 2:
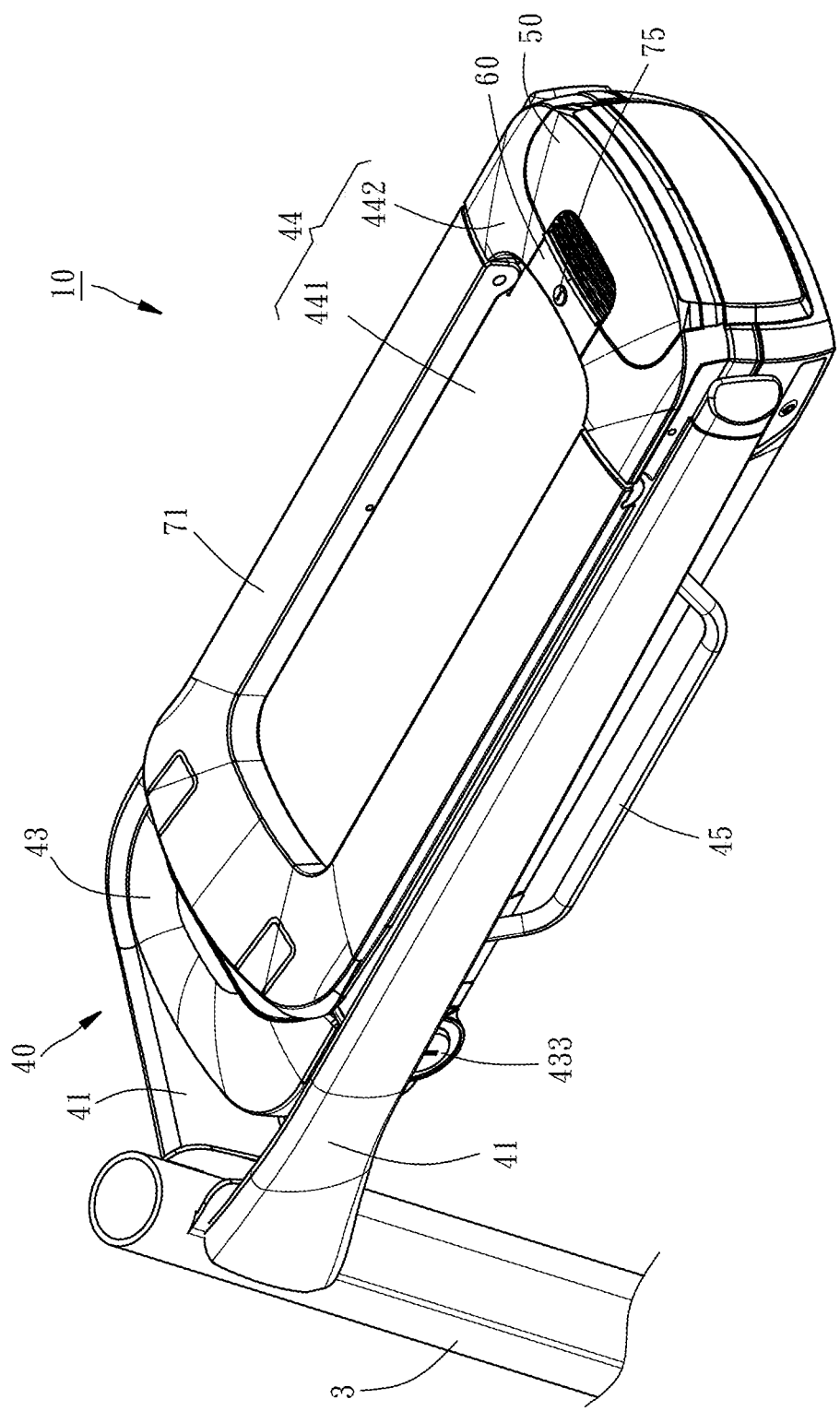
FIG. 2 is an enlarged view of a part of FIG. 1, illustrating the bicycle mounting mechanism and battery box assembly.
Figure 3:
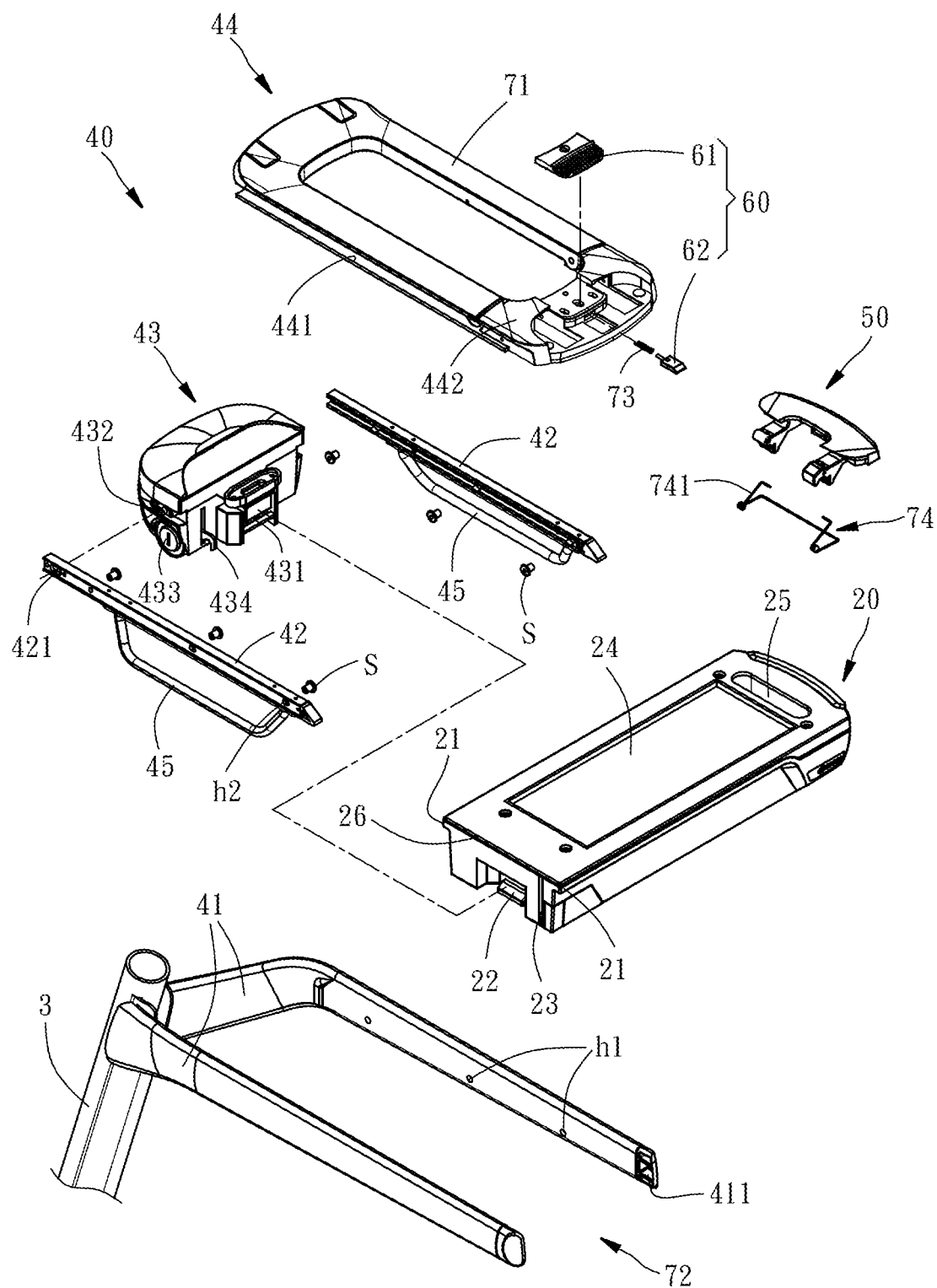
FIG. 3 is an exploded view of FIG. 2.

Referring to FIGS. 1-3, a bicycle mounting mechanism and battery box assembly 10 in accordance with a first embodiment of the present invention is provided. It is mounted to a seat tube 3 of a bicycle frame 2 of a bicycle 1. The assembly 10 comprises a battery box 20 and a mounting mechanism 30.

The battery box 20 is adapted for providing electricity, comprising two sliding blocks 21 respectively located at two opposite lateral sides thereof, a set of terminals 22 and a retaining portion 23 both disposed at a front side thereof, and an abutment recess 24 and an opening 25 located at a top side thereof. The abutment recess 24 has a predetermined depth. The opening 25 is disposed at a rear side relative to the abutment recess 24 and cuts through opposing top and bottom walls of the battery box 20 for allowing the user to grasp the battery box 20 conveniently.

The mounting mechanism 30 comprises a locating component unit 40, a grip 50, a switch device 60 and a baffle 71.

The locating component unit 40 comprises a set of support members 41, a set of sliding rails 42, a control box 43 and a top cover 44. The set of support members 41 are elongated members arranged at an interval, each of which has one end thereof curved inwards and is welded to the seat tube 3, and an opposite end thereof (hereinafter called as the distal end) extends in a direction toward the rear side of the bicycle. Each support member 41 comprises three screw holes h1 located on an inner wall thereof, and a lamp holder 411 located at the distal end thereof for the mounting of a LED lamp. Thus, the distal end of each support member 41 can emit light.

The set of sliding rails 42 are arranged in a pair and respectively mounted at the inner walls of the support members 41 so that the battery box 20 can be slidably coupled to the sliding rail 42 by means of the sliding blocks 21. Each sliding rail 42 comprises a positioning hole 421 disposed near a front end thereof and three screw holes h2 longitudinally backwardly spaced from the positioning hole 421. Screws s are respectively mounted in the screw holes h2 of the sliding rails 42 and fastened to the respective screw holes h1 of the support members 41 to affix the sliding rails 42 to the locating component unit 40. Further, each sliding rail 42 may include a bracket 45 at a bottom side thereof for the user to bind goods (not shown). Alternatively, the brackets 45 can be changed to other attachments, such as side bags, baby seat supports or elastic rope hooks.

The control box 43 is adapted for transmitting the electricity of the battery box 20 through the internal circuitry thereof to the electrical devices (such as bicycle lamp 4 and wheel motor 5) of the bicycle 1. The control box 43 further comprises a electric connector 431 arranged at a rear side thereof and electrically connected to terminals 22 of the battery box 20, and two positioning portions 432 respectively located at two opposite lateral sliders thereof for connection to the positioning holes 421 of the respective sliding rails 42. Thus, the control box 43 can be fastened to the support members 41 through the sliding rails 42. The control box 43 further comprises a lock 433. The lock 433 has a swivel hook 434. When locking the lock 433, the swivel hook 434 is biased backwards and hooks the retaining portion 23 of the battery box 20. Thus, the battery box 20 cannot be pulled out and keep exempt from theft.

Figure 4:
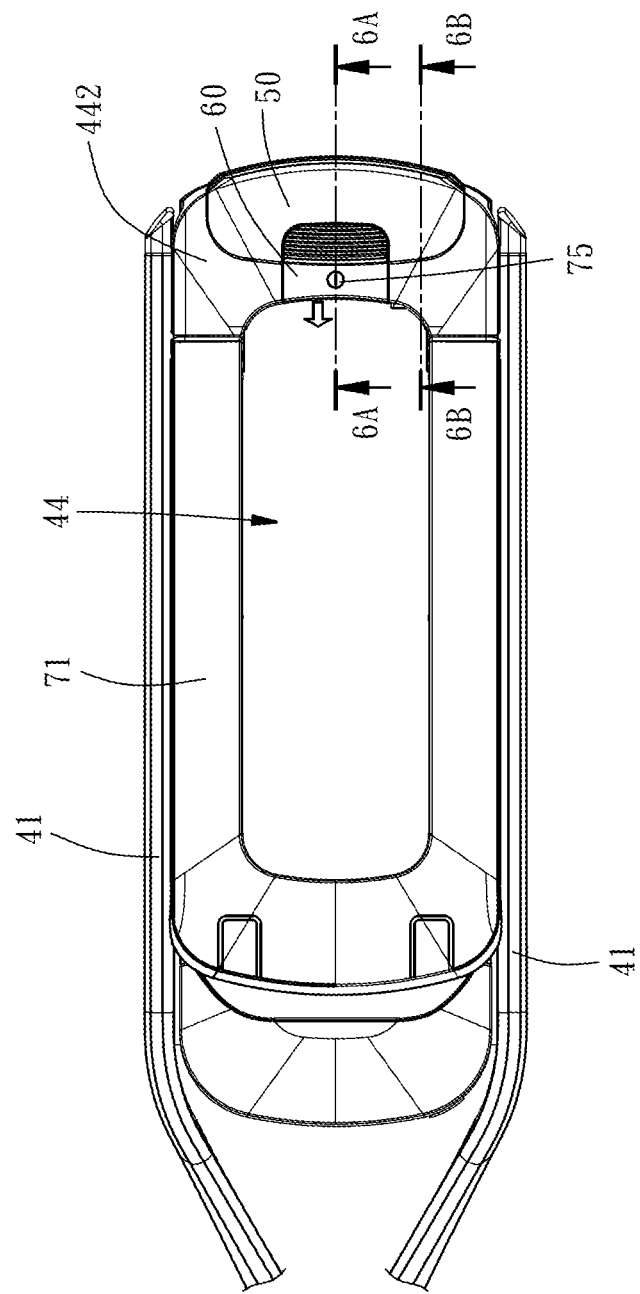
FIG. 4 is a top view of FIG. 2.

The top cover 44 is fixedly mounted on the support members 41 so that the top cover 44 and the support members 41 can jointly define an accommodation chamber 72 for the mounting of the battery box 20, the sliding rails 42 and the control box 43 in a detachable manner. Structurally speaking, the top cover 44 comprises a bottom plate 441 and a holder block 442. The holder block 442 is mounted on the bottom plate 441 near a rear side thereof. As illustrated in FIG. 4, the holder block 442 is adapted for pivot connection of the grip 50 and installation of the switch device 60, which will be described as follows. Further, the holder block 442 defines therein a spring mounting groove 443 (see FIG. 6A).

Figure 5:
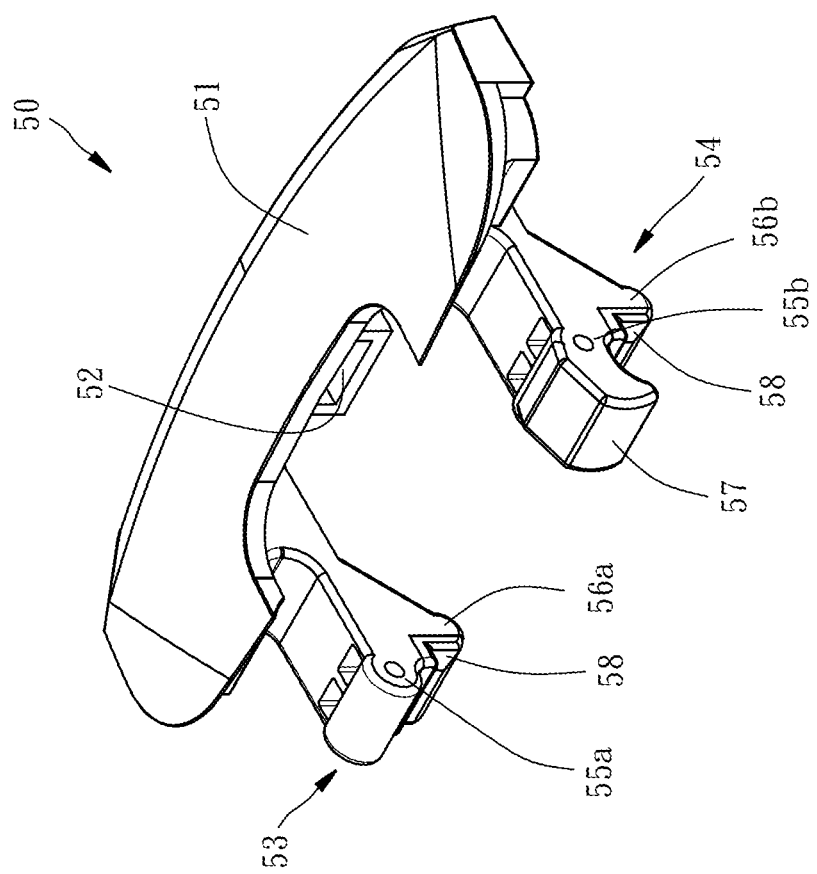
FIG. 5 is an enlarged view of a grip in accordance with the first embodiment of the present invention.
Figure 8:
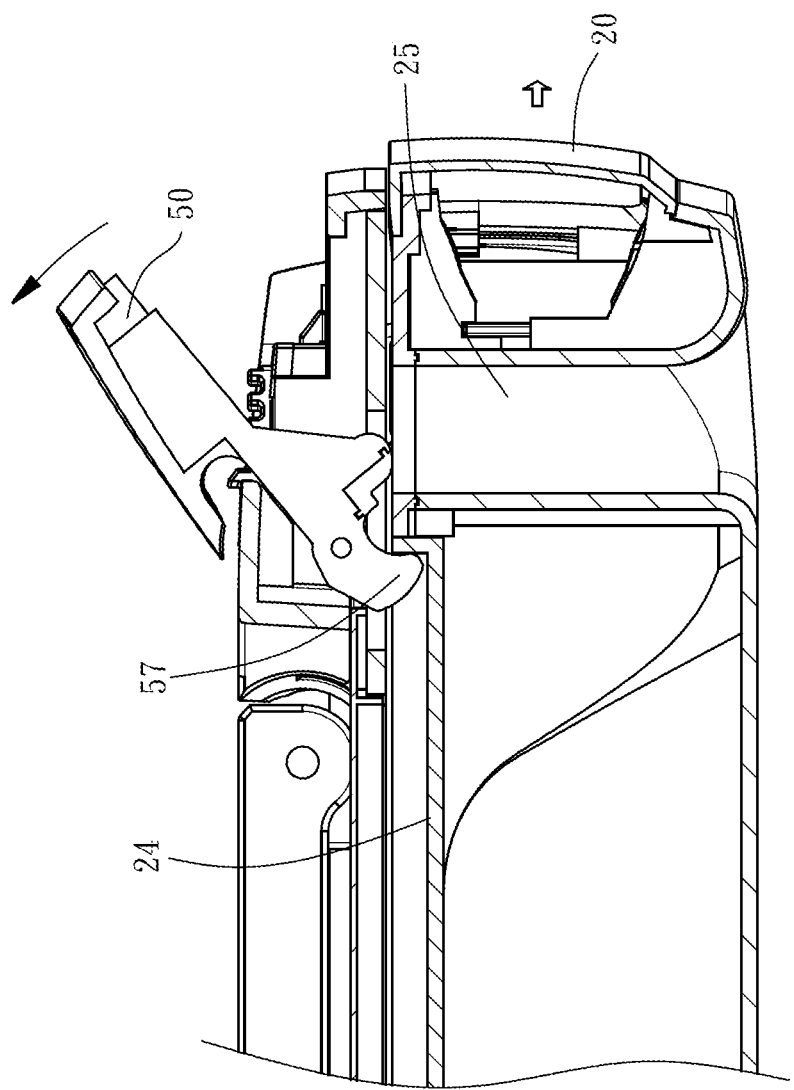
FIG. 8 and FIG. 9 are schematic applied views of the assembly in accordance with the first embodiment of the present invention.

Referring to FIG. 5, the grip 50 is pivotally connected to the holder block 442, structurally comprising a grip body 51, a plug hole 52 located at a bottom of the grip body 51, a first leg 53 and a second leg 54. The grip body 51 is adapted for grasping by the user to rotate the first and second legs 53,54. The first leg 53 comprises a pivot-connection portion 55a and an abutment end portion 56a. The second leg 54 comprises a pivot-connection portion 55b, an abutment end portion 56b and a push end portion 57. Further, the abutment end portions 56a,56b of the first and second legs 53,54 are respectively mounted with a flexible pad 58. The flexible pad 58 is made of an elastically deformable material softer than the abutment end portions 56a,56b, providing buffering and accurate positioning effects. Through the two pivot-connection portions 55a,55b, the grip 50 is pivotally connected to the holder block 442. Each pivot-connection portion 55a,55b is disposed relatively close to the respective abutment end portion 56a,56b (and the push end portion 57) and relatively far from the respective grip body 51, increasing the arm of force of the grip 50 and achieving the effect of effort-saving. The grip 50 is rotatable between an open position and a close position. When the grip 50 is set in the close position (see FIG. 6B), the abutment end portions 56a,56b are disposed in the opening 25, the flexible pads 58 are abutted against an inner wall of the opening 25, forcing the terminals 22 of the battery box 20 into exact contact with the electric connector 431 of the control box 43 to conduct electricity. At this time, the abutment end portions 56a,56b are engaged with the opening 25, and the push end portion 57 does not contact a peripheral wall of the abutment recess 24. Under normal circumstances, the user cannot pull the battery box 20 backwards. Further, when the grip 50 is set in the open position (see FIG. 8), the abutment end portions 56a,56b are disposed outside the opening 25. At this time, the abutment end portions 56a,56b are disengaged from the opening 25. The push end portion 57 is abutted against a rear side wall of the abutment recess 24, allowing rotating of the grip 50 to exert a backward push force to the abutment recess 24 to move the battery box 20 backward and to further disconnect the terminals 22 of the battery box 20 from the electric connector 431 of the control box 43, and thus, the terminals 22 and the electric connector 431 are disconnected.

Figure 6A:
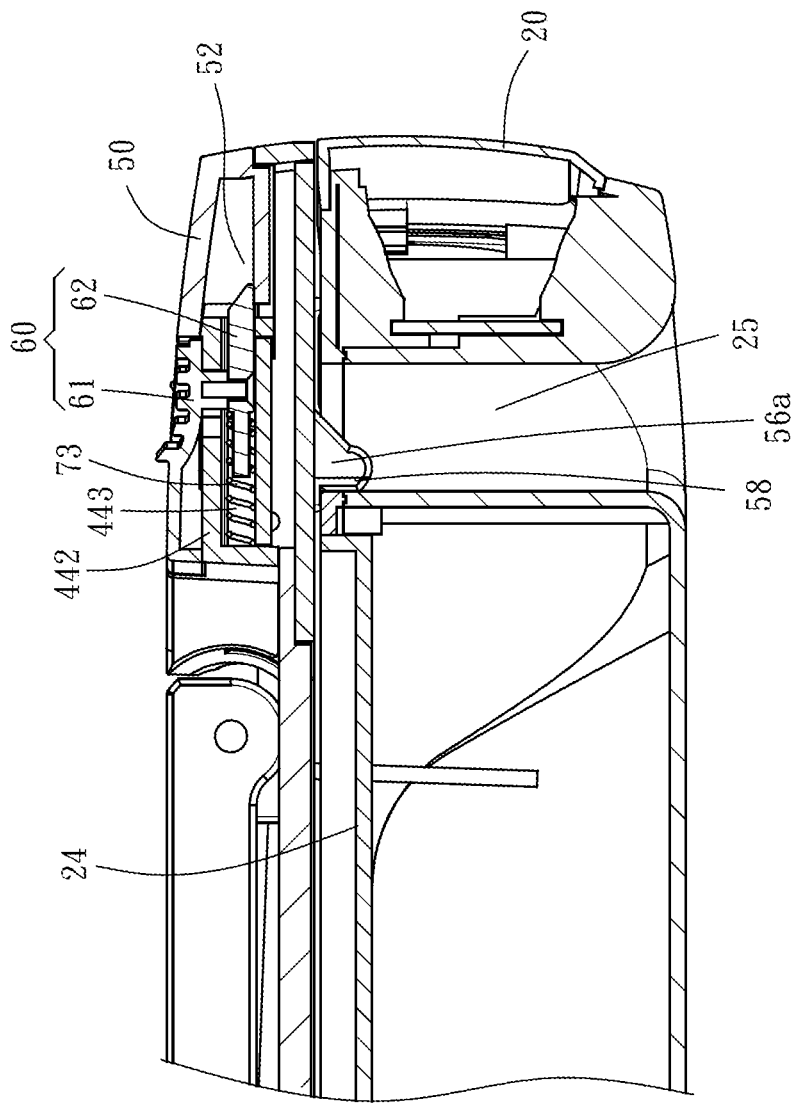
FIG. 6A is a sectional view taken along line 6A-6A of FIG. 4.
Figure 6B:
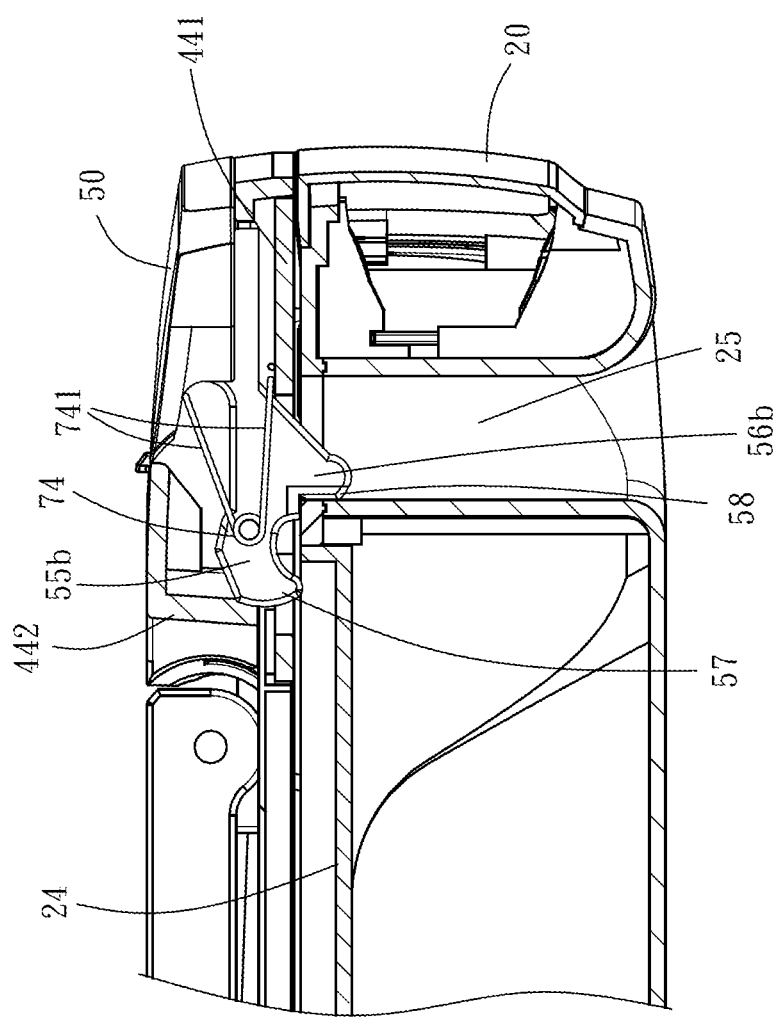
FIG. 6B is a sectional view taken along line 6B-6B of FIG. 4.
Figure 7A:
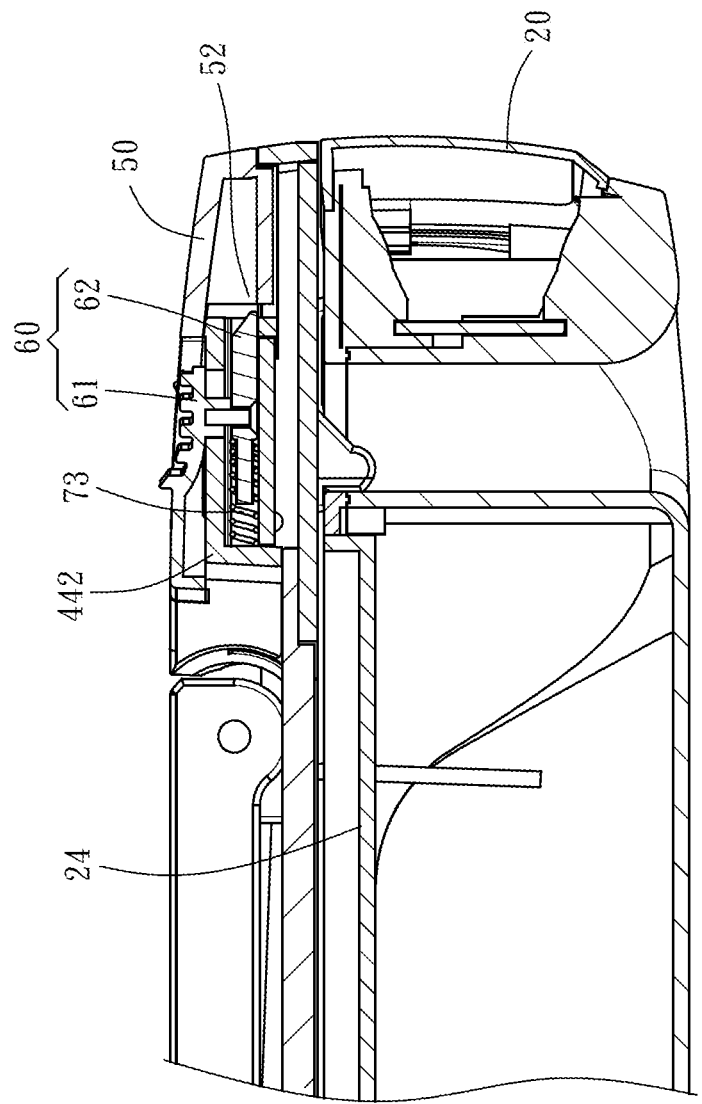
FIG. 7A is similar to FIG. 6A, illustrating a pin disengaged from a plug hole.

To enhance the application convenience of the grip 50, the mounting mechanism 30 further comprises a compression spring 73 and a torsion spring 74 adapted for mating with the switch device 60 so that the grip 50 can be automatically opened when needed to be used. As illustrated in FIG. 3, FIG. 6A and FIG. 7A, the switch device 60 is forwardly and backwardly movably mounted on the holder block 442, comprising a toggle key 61 and a pin 62. The pin 62 is connected to the toggle key 61 and mounted in the spring mounting groove 443, and movable with the toggle key 61 forwardly into or backwardly out of the plug hole 52 of the grip 50. The compression spring 73 has two opposite ends thereof respectively stopped against the pin 62 and an inner end wall of the spring mounting groove 443. As illustrated in FIG. 6B, the torsion spring 74 is mounted at the pivot-connection portions 55a,55b of the grip 50, having two opposing end pieces 741 respectively abutted against the grip 50 and the bottom plate 441 of the top cover 44.

In application, when the grip 50 is set in the close position, the pin 62 is plugged in the plug hole 52 of the grip 50 (see FIG. 6A), the torsion spring 74 is compressed by the grip 50 (see FIG. 6B), and thus, the torsion spring 74 stores elastic restoring force. On the other hand, the abutment end portions 56a,56b of the grip 50 are inserted into the accommodation chamber 72, and the flexible pads 58 are stopped against the inside wall of the opening 25 to lock the battery box 20.

When the user needs to dismount the battery box 20, the user can push the toggle key 61 to move the pin 62 forwardly in compressing the compression spring 73 for storing elastic restoring force till the situation that the pin 62 is disengaged from the plug hole 52 (see FIG. 7A). At this time, the grip 50 is no longer subject to the pin 62, and rotates upwardly to the open position by the elastic restoring force of the torsion spring 74 (see FIG. 8). The abutment end portions 56a,56b also rotates with the grip 50 out of the opening 25 (e.g. without abutting against the inner wall of the opening 25), and the push end portion 57 also rotates with the grip 50 moves into the accommodation chamber 72 into abutment against the rear side wall of the abutment recess 24 Thus, the user can easily grasp the grip body 51 of the grip 50 to exert a force to the battery box 20 through the push end portion 57 to push the battery box 20 backwards and to electrically disconnect the battery box 20 from the electric connector 431 of the control box 4 (see FIG. 8). At this time, the user can hold the opening 25 of the battery box 20 to pull the battery box 20 out of the mounting mechanism 30 along the sliding rails 42 (see FIG. 9).

Figure 7B:
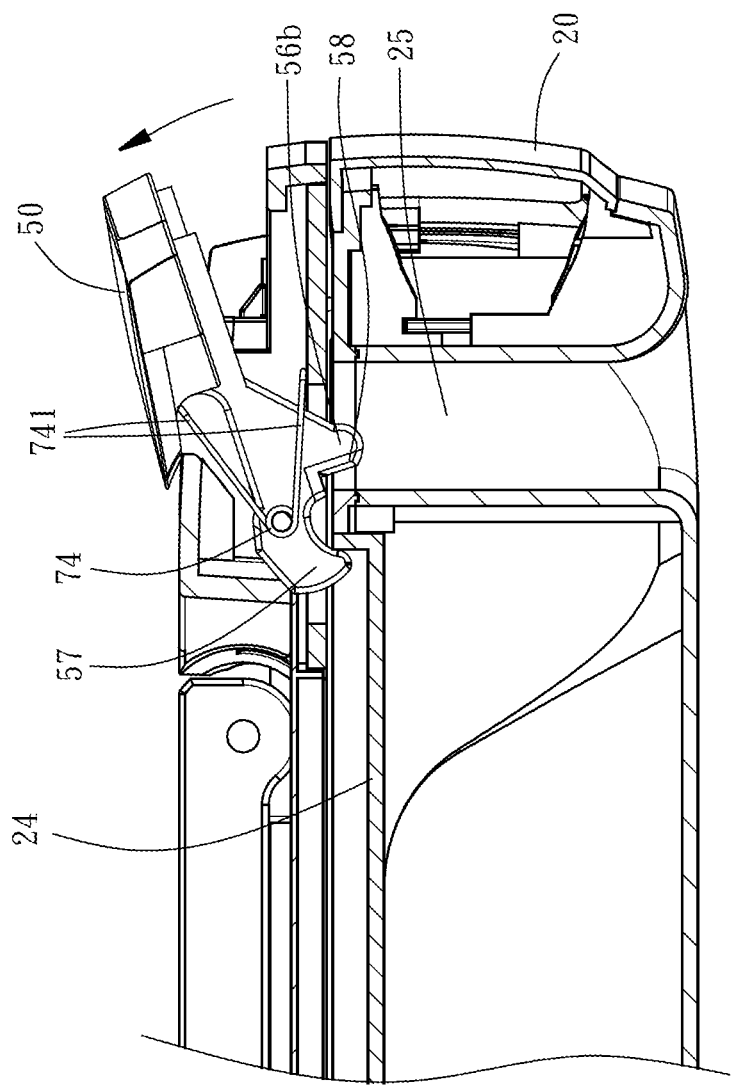
FIG. 7B is similar to FIG. 6B, illustrating the grip opened automatically.
Figure 9:
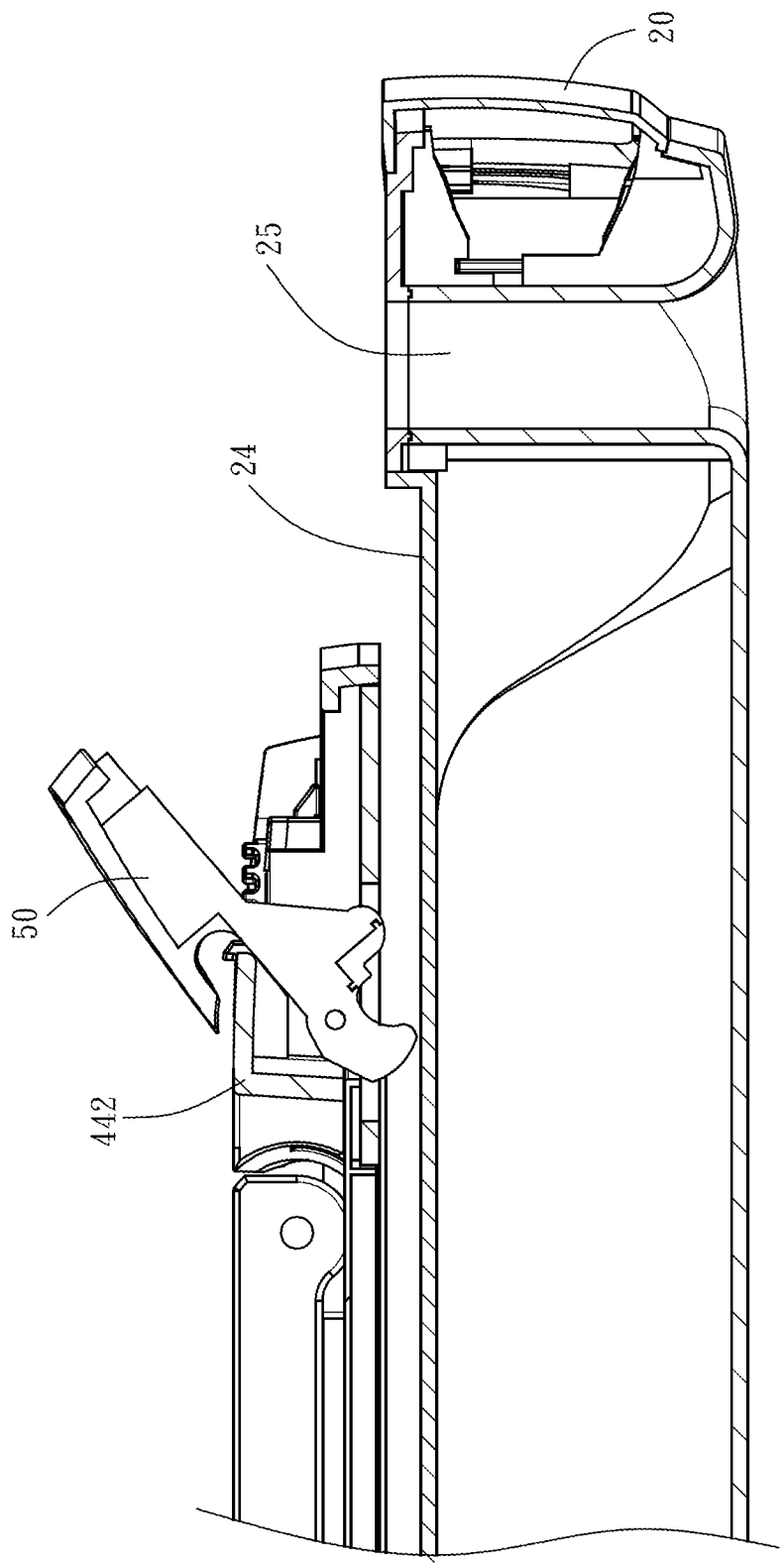

On the other hand, as illustrated in FIG. 3 and FIG. 9, when the user needs to install the battery box 20, the user simply needs to push the battery box 20 forwardly along the sliding rails 42 in moving the push end portion 57 over a front end wall 26 of the battery box 20, and then to rotate the grip 50 to the close position (see FIG. 6B) after the push end portion 57 touches the rear side wall of the abutment recess 24 (see FIG. 7B), forcing the abutment end portion 56a,56b to move into the accommodation chamber 72 into abutment against the inside wall of the opening 25 again. Under the effect of the elastic restoring force of the compression spring 73, the pin 62 is pushed backwards and plugged into the plug hole 52 (see FIG. 6A) to lock the grip 50 and the battery box 20.

In view of the above, the assembly 10 of the present invention allows removal of the battery box 20 through the grip 50 in a rather effort-saving way. Further, when installing the battery box 20 into the mounting mechanism 30, the grip 50 can secure the battery box 20 through the abutment end portion 56a,56b, thereby more efficiently and accurately positioning the battery box 20.

Figure 10:
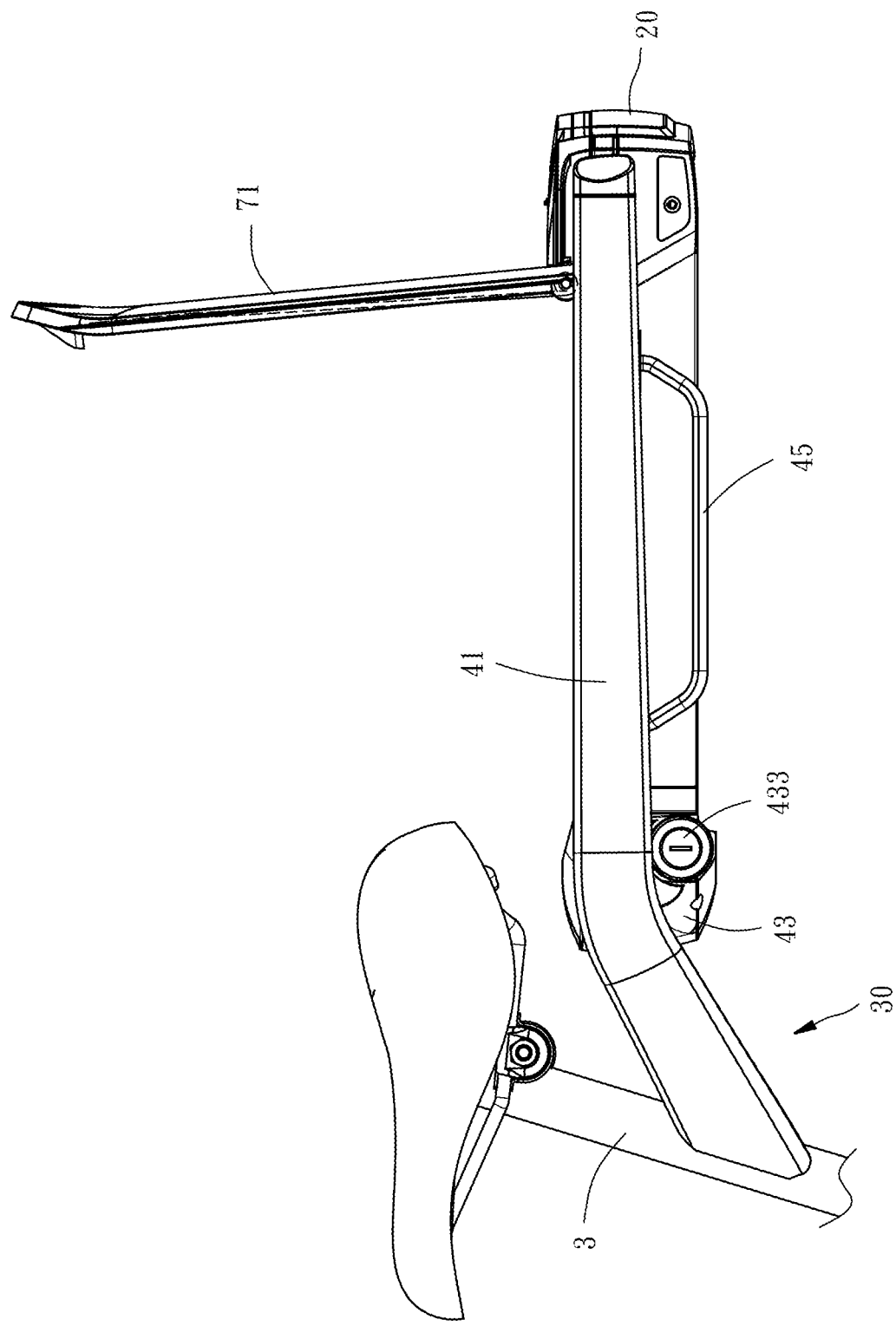
FIG. 10 is a side view of the assembly in accordance with the first embodiment of the present invention, illustrating the baffle opened.

It is to be noted that to more effectively secure the grip 50 when the grip 50 is in the close position, the switch device 60 may be configured to provide a locking member 75 for locking the grip 50, preventing the user from accidentally and excessively pulling the battery box 20 while limiting the displacement of the battery box 20. On the other hand, the mounting mechanism 30 further may further comprise a baffle 71 pivotally connected to the top cover 44 (see FIG. 4 and FIG. 10) for allowing the user to mount other objects to the mounting mechanism 30, so that the mounting mechanism 30 has a function similar to a conventional bicycle luggage carrier.

Figure 11A:
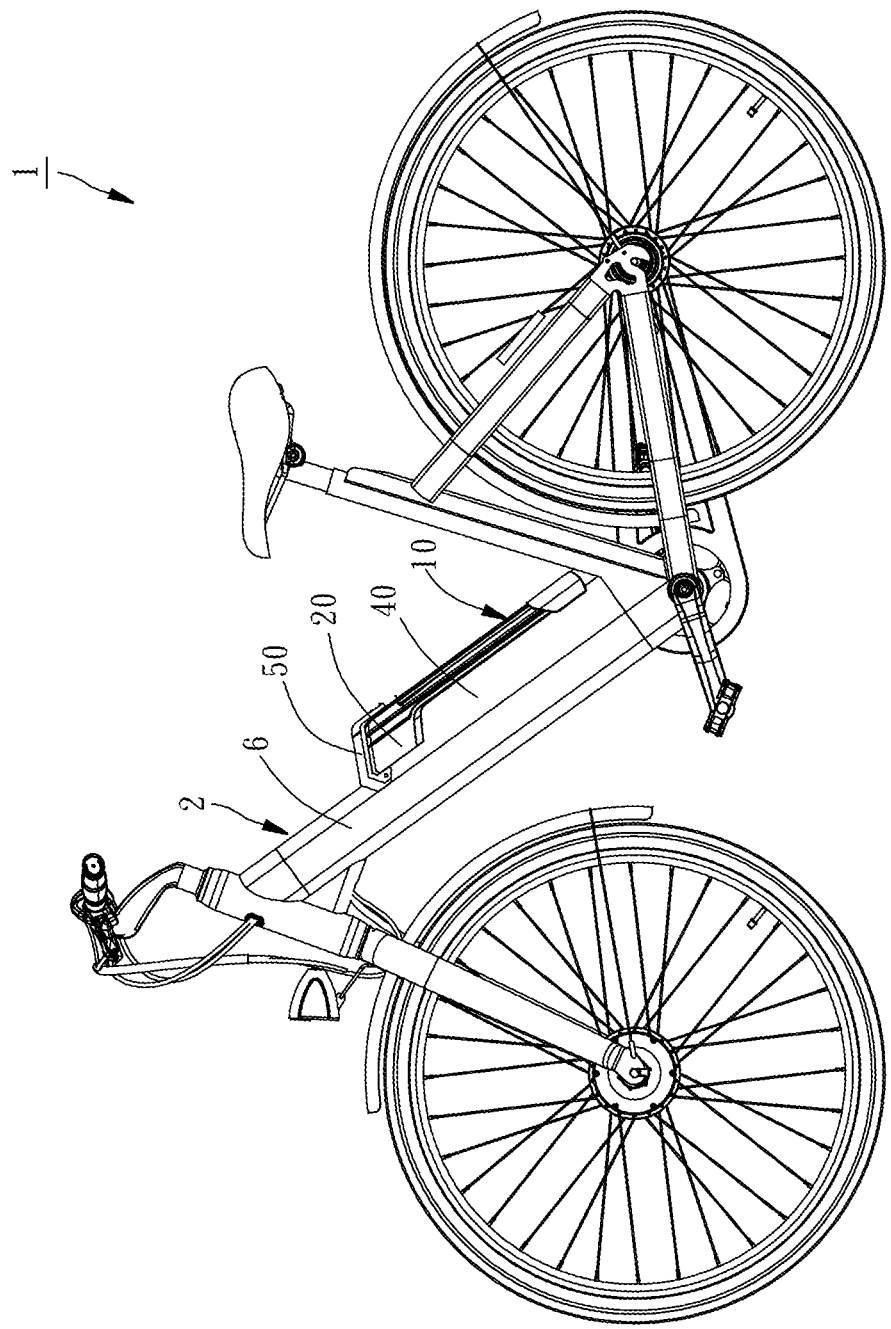
FIGS. 11A and 11B are schematic side views, illustrating a bicycle mounting mechanism and battery box assembly installed in a down tube of a bicycle frame in accordance with a second embodiment of the present invention.
Figure 11B:
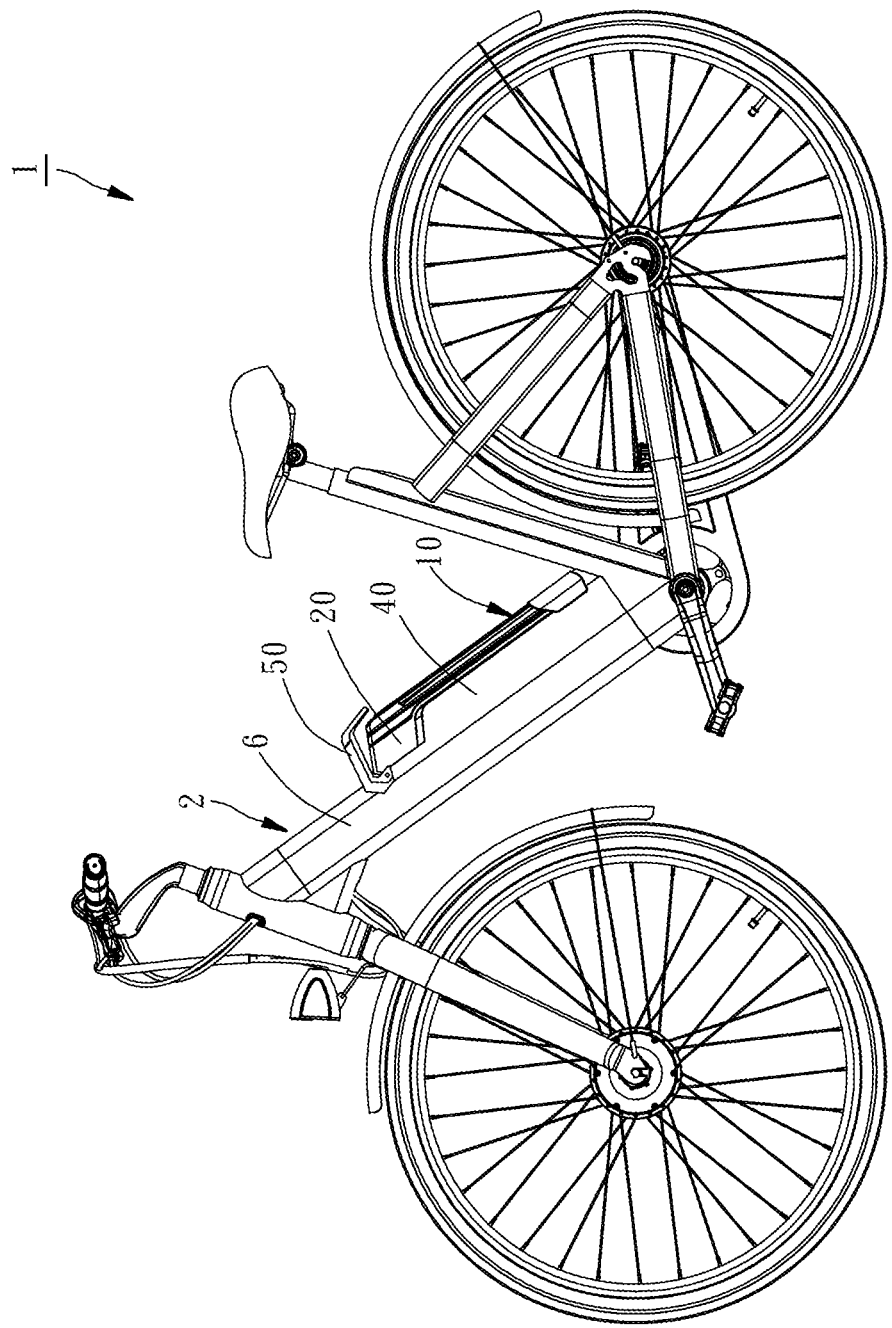

The assembly 10 of the present application may be mounted to a different location of the bicycle frame 2 of the bicycle 1. A second embodiment of the present invention is provided, as illustrated in FIGS. 11A and 11B. The assembly 10 is similar to the aforesaid first embodiment with the difference that the locating component unit 40 of assembly 10 of this second embodiment is mounted to the down tube 6 of the bicycle frame 2, and the grip 50 is mounted at a top side of the locating component unit 40, facilitating mounting and dismounting of the battery box 20 from the locating component unit 40.

Figure 12A:
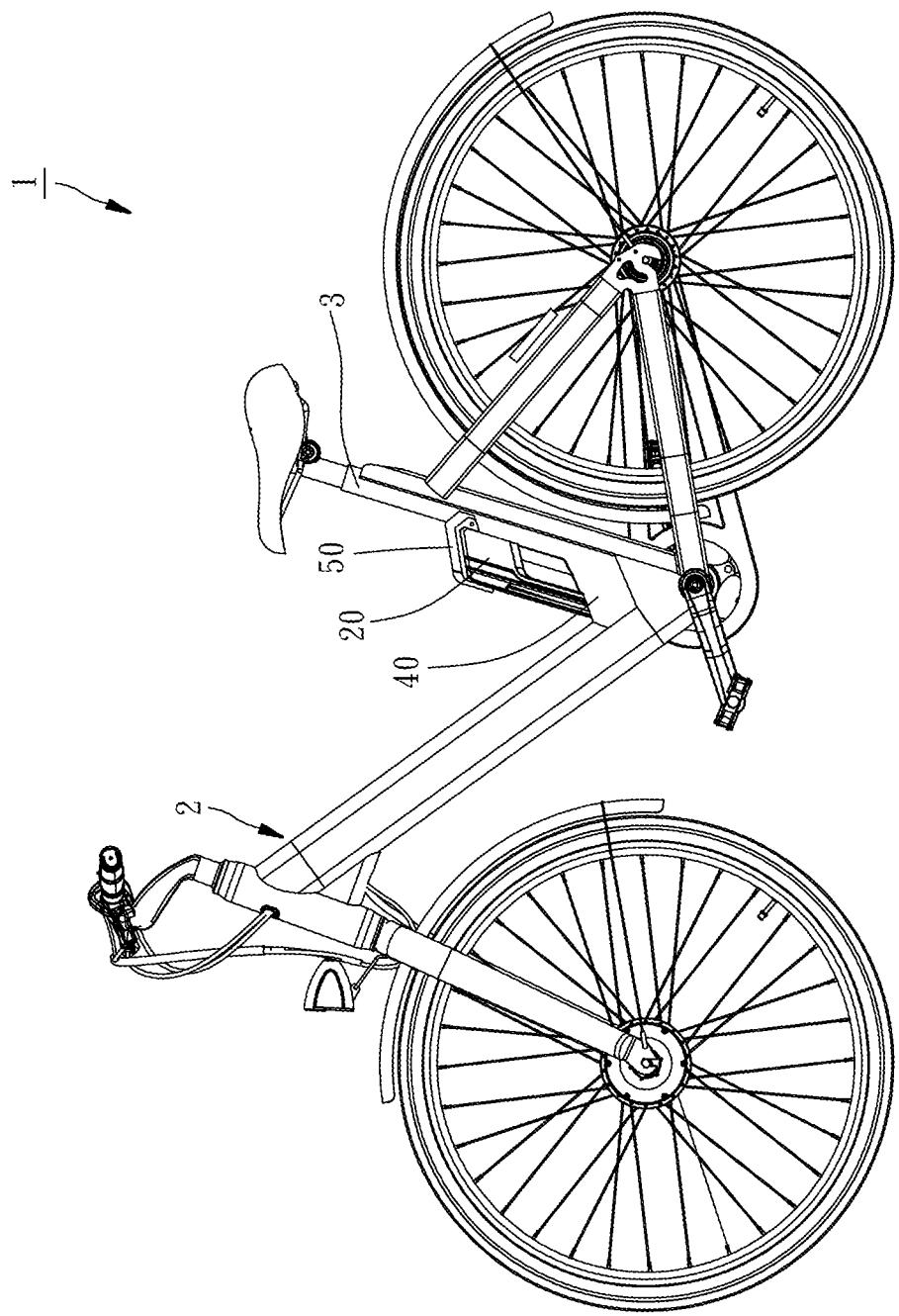
FIGS. 12A and 12B are schematic side views, illustrating a bicycle mounting mechanism and battery box assembly installed in a seat tube of a bicycle frame in accordance with a third embodiment of the present invention.
Figure 12B:
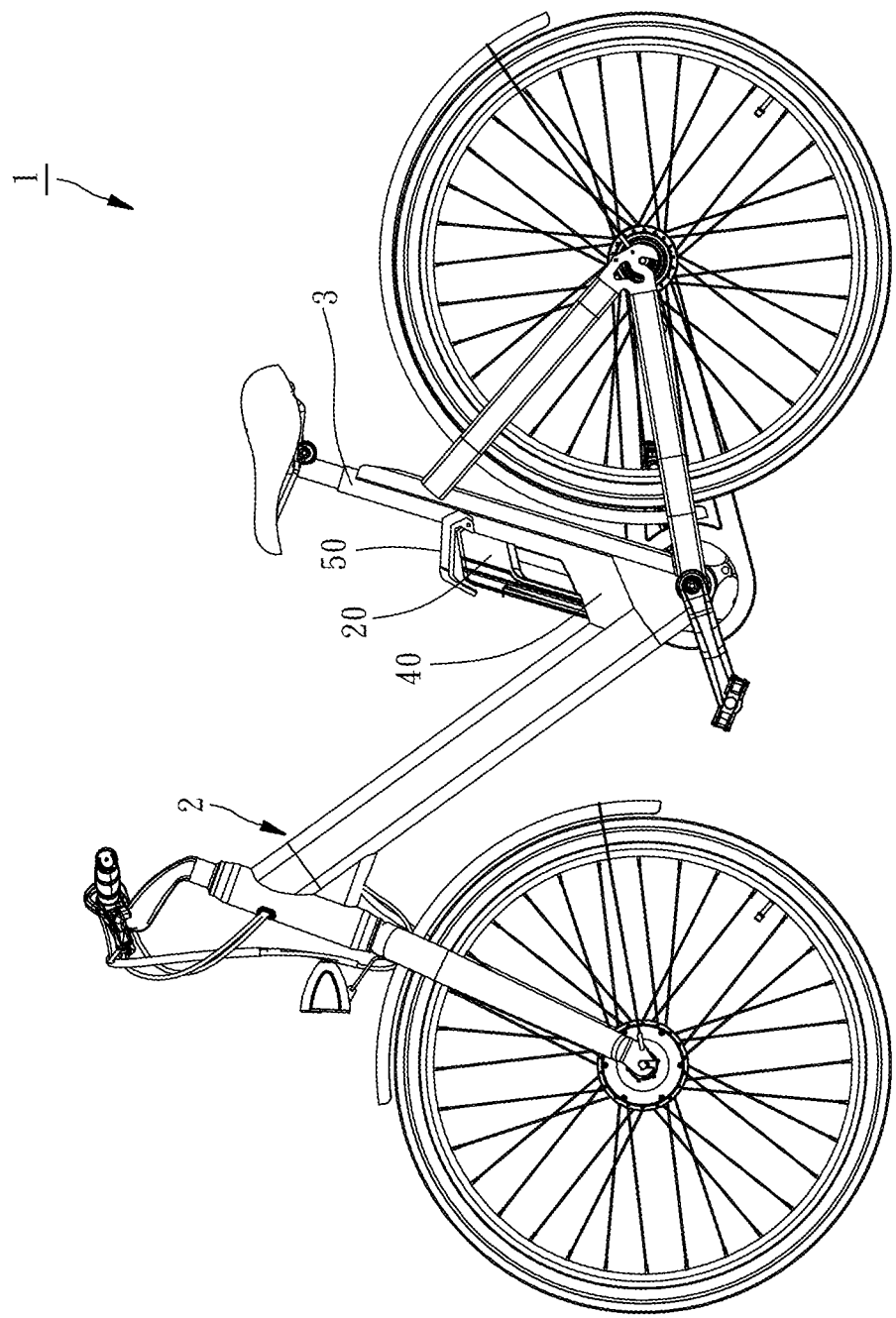

Similar to the second embodiment, a third embodiment of the present invention is provided, as illustrated in FIGS. 12A and 12B. In the third embodiment, the locating component unit 40 is fastened to and extended along the seat tube 3.

Figure 13:
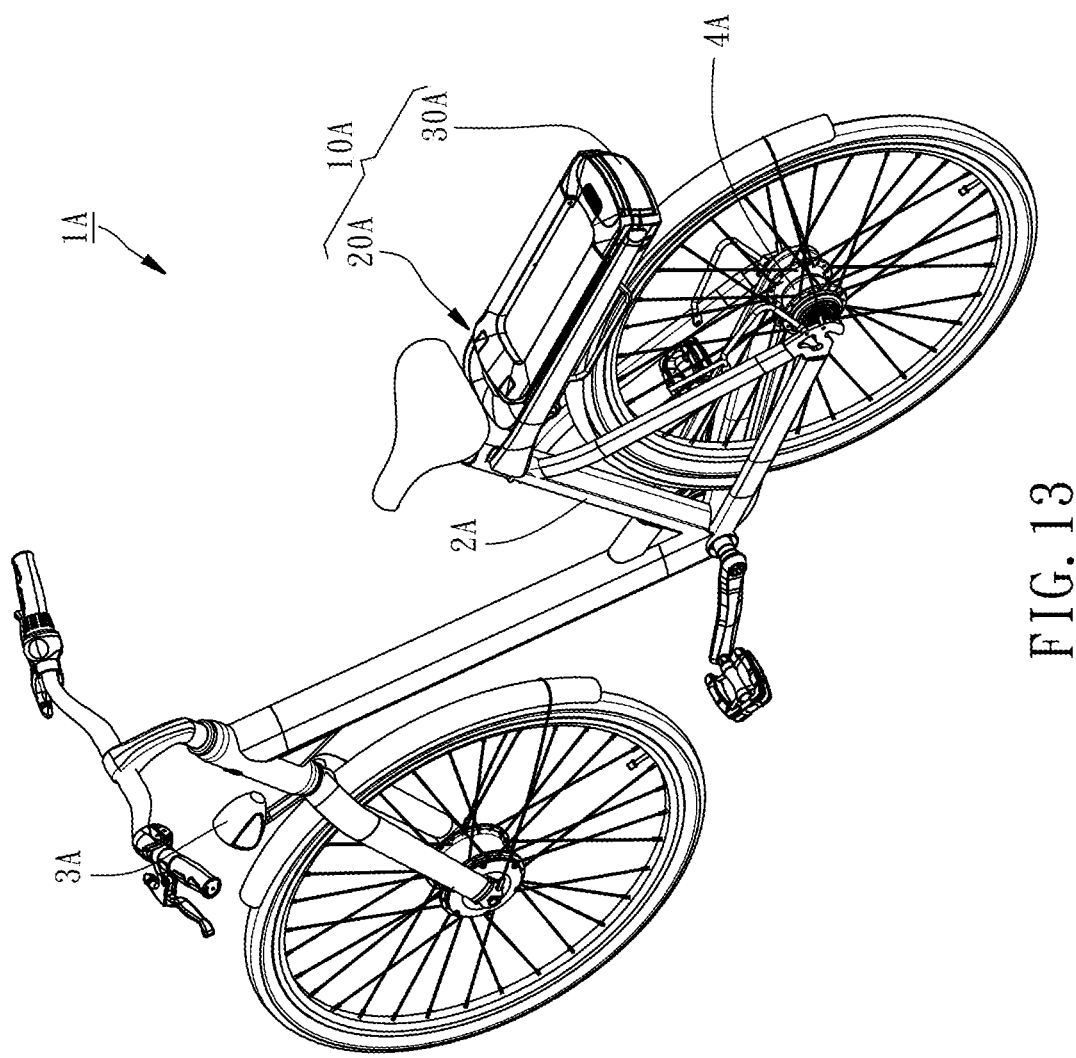
FIG. 13 is an oblique top elevational view of a bicycle in accordance with a fourth embodiment of the present invention.

Referring to FIG. 13, an assembly 10A of a luggage carrier 20A and a battery box 30A in accordance with a fourth embodiment of the present invention is shown. The assembly 10A comprises a luggage carrier 20A and a battery box 30A. The assembly 10A is mounted to a seat tube 2A of a bicycle 1A. Further, to facilitate explanation of the following preferred embodiment of the present invention, the assembly 10A is mounted at a back side of the seat tube 2A. In following description, the heading direction of the bicycle 1A is directed to the front direction of the assembly 10A.

Figure 14:
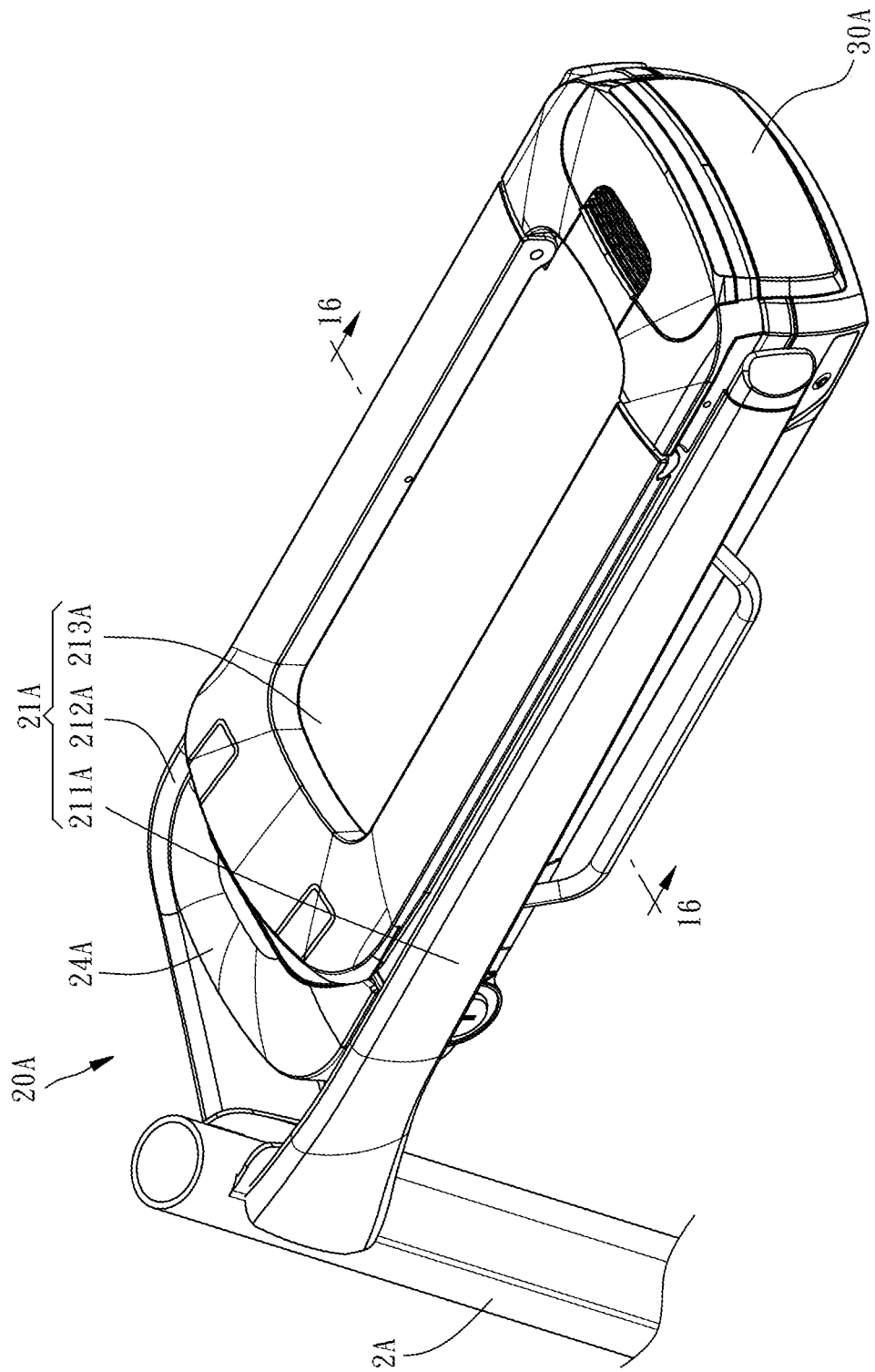
FIG. 14 is an enlarged view of a part of FIG. 13, illustrating the combination of luggage carrier and battery box assembly.
Figure 15:
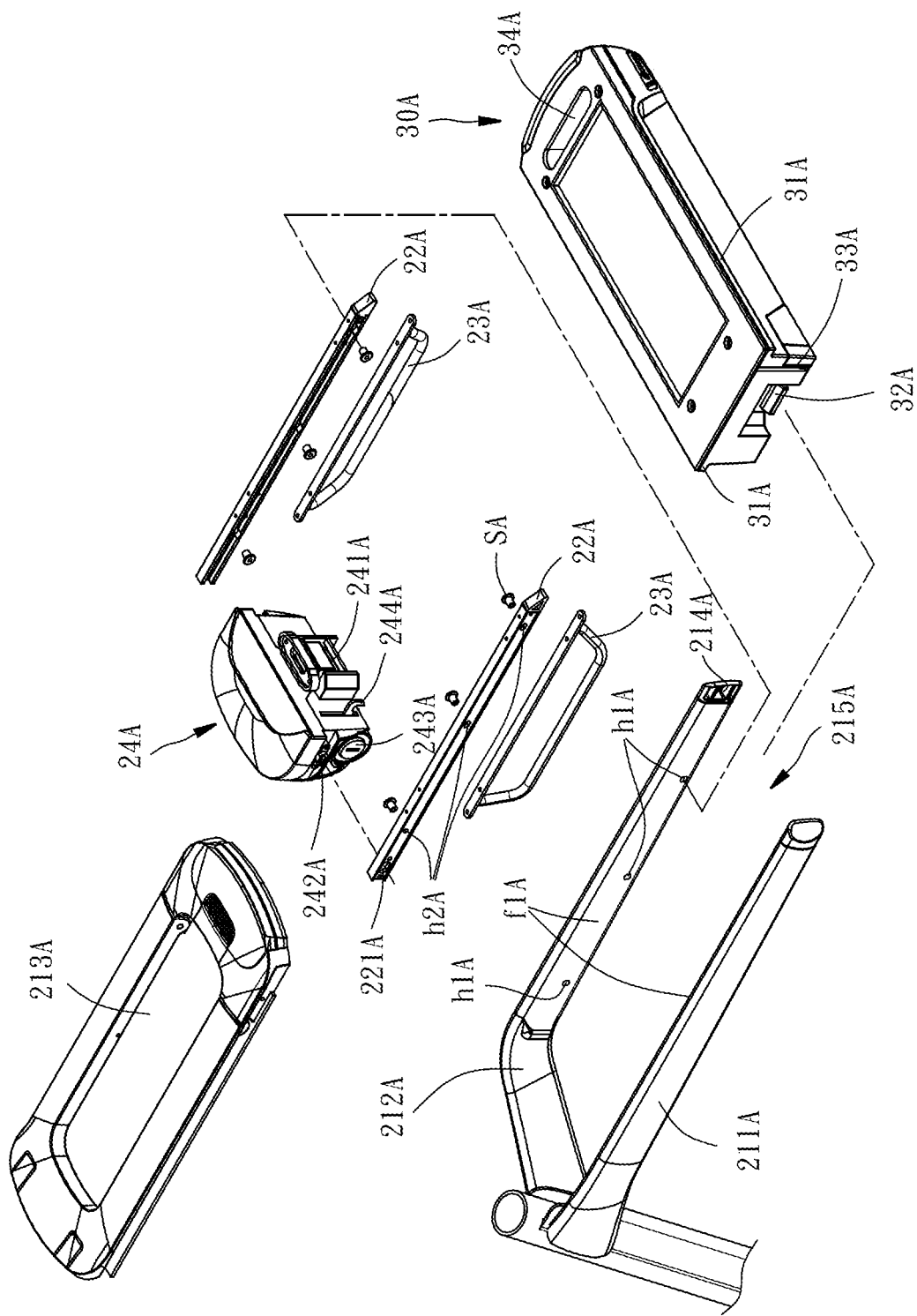
FIG. 15 is an exploded view of FIG. 14.

Referring to FIGS. 14 and 15, the luggage carrier 20A comprises a locating component unit 21A, and a set of sliding rails, for example, two sliding rails 22A. The locating component unit 21A comprises a first support member 211A, a second support member 212A, and a top cover 213A. The first support member 211A and the second support member 212A are shaped in elongated bars arranged at an interval, each having one end thereof curved inward and welded to the seat tube 2A, and an opposite end thereof (the terminal end) extending toward the rear side of the bicycle 1A. Further, the first and second support members 211A, 212A each have three screw holes h1A located on an inner wall f1A thereof and a lamp holder 214A located at the terminal end thereof. The lamp holder 214A is adapted for installing a LED lamp so that the terminal ends of the first and second support members 211A, 212A can emit light. The top cover 213A is fixedly mounted on the first and second support members 211A, 212A such that the top cover 213A, the first support member 211A and the second support member 212A can jointly define an accommodation chamber 215A.

The sliding rails 22A and the battery box 30A are mounted in the accommodation chamber 215A. The sliding rails 22A are respectively mounted at the inner walls f1A of the first and second support members 211A, 212A, each having a positioning hole 221A disposed near a front end thereof and three screw holes h2A longitudinally backwardly spaced from the positioning hole 221A in such a way that the user can fasten each of the sliding rails 22A to the first and second support members 211A, 212A by screw screws SA into each screw holes h1A of the first and second support members 211A, 212A. Further, a bracket 23A is mounted at a bottom side of each sliding rail 22A. The brackets 23A are fastened to the respective sliding rails 22A with screws. The brackets 23A are used for users to bind goods (not shown). Alternatively, the brackets 23A may be replaced by other attachments such as side bags, baby seat supports or elastic rope hooks.

Figure 16:
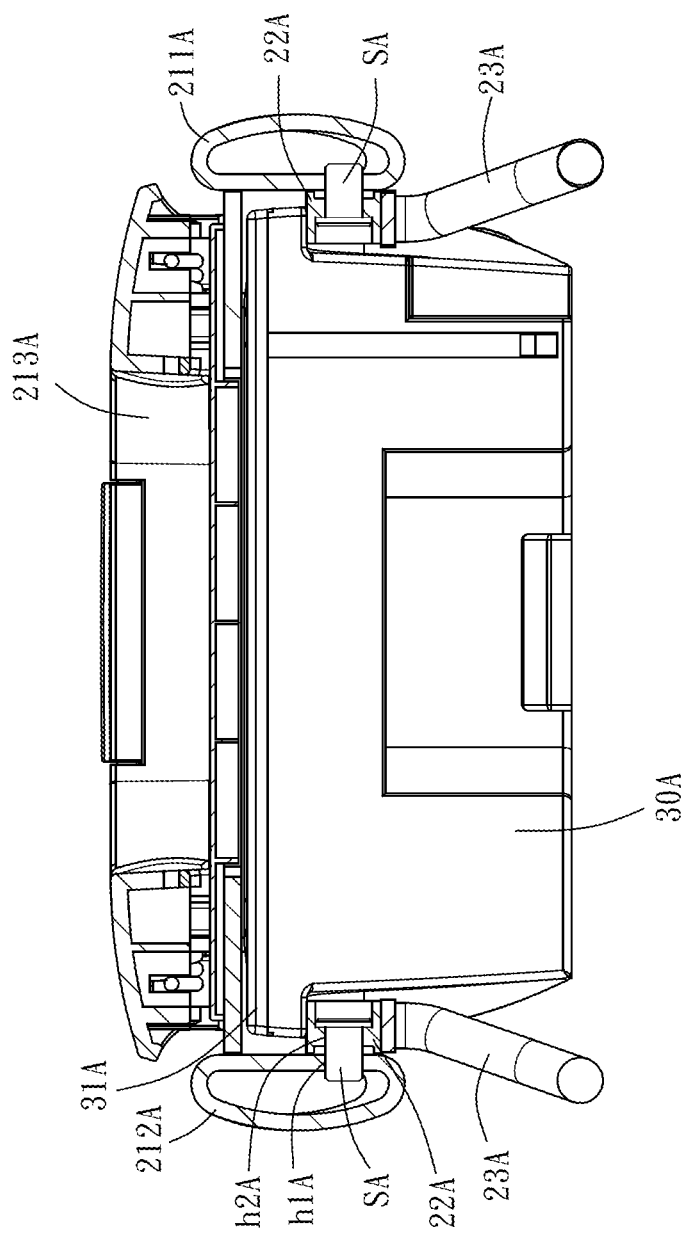
FIG. 16 is a sectional view taken along line 4-4 of FIG. 14.

The battery box 30A is adapted for providing electricity, having two sliding coupling structures 31A respectively located at two opposite lateral sides thereof (in the fourth embodiment, the sliding coupling structures 31A are sliding blocks) By means of the sliding coupling structures 31A, the battery box 30A is slidably coupled to the sliding rails 22A (see FIG. 16). Further, the battery box 30A comprises a set of terminals 32A and a retaining portion 33A disposed at a front side thereof, and a recessed handhold 34A located at an opposing rear side thereof. Through the recessed handhold 34A, the user can easily pull the battery box 30A out of the sliding rails 22A.

It is to be noted that the number of the sliding rail 22A may be reduced to one, and this single sliding rail 22A may alternatively be mounted at the bottom side of the top cover 213A, allowing the battery box 30A to be fastened to the locating component unit 21A through the sliding rail 22A. Therefore, the number of the sliding rail 22A should not be a limitation.

Figure 17:
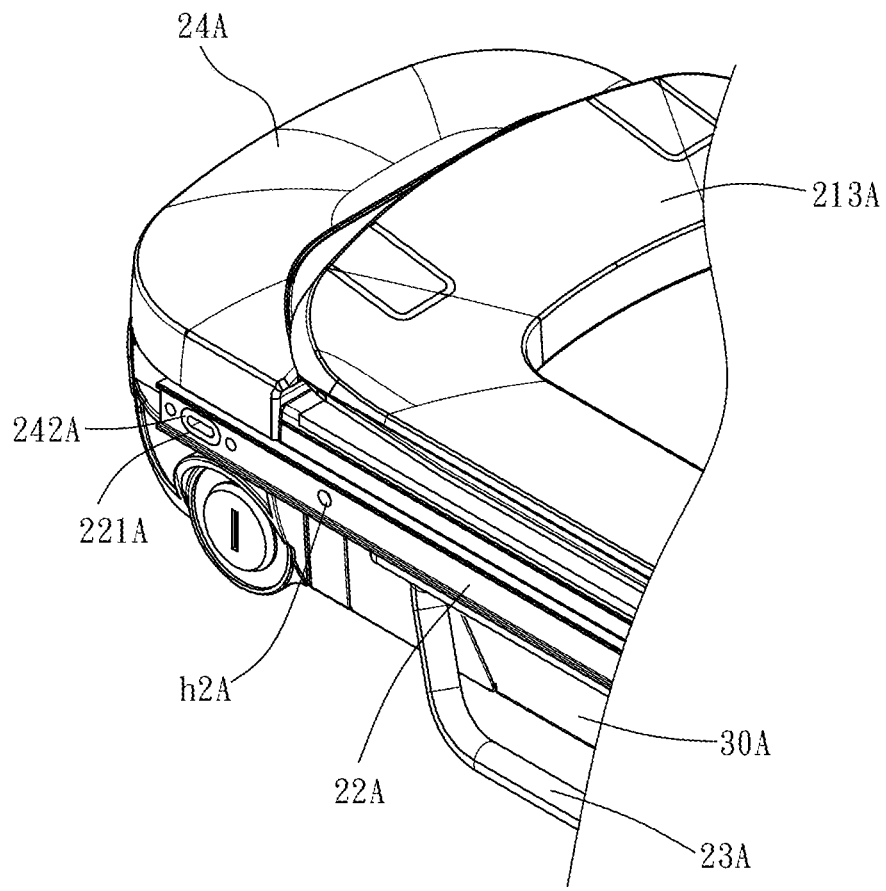
FIG. 17 is an enlarged view of a part of FIG. 14, illustrating the connection between the sliding rail and the control box

Optionally, the luggage carrier 20A may further comprise a control box 24A. The control box 24A is mounted in the accommodation chamber 215A near the seat tube 2A. The control box 24A is adapted for transmitting the electricity of the battery box 30A through the internal electrical circuitry to the electrical devices (such as bicycle lamp 3A and wheel motor 4A; see FIG. 13). The control box 24A comprises a electric connector 241A arranged at a rear side thereof to electrically connecting the terminals 32A of the battery box 30A, and two positioning portions 242A (see the enlarged view of FIG. 17) respectively located at two opposite lateral siders thereof for connection to the positioning holes 221A of the respective sliding rails 22A. Further, the sliding rails 22A and the control box 24A can be fastened together with screws. It is to be noted that the control box 24A is affixed to the first and second support members 211A, 212A through the sliding rails 22A, i.e., the control box 24A is not directly affixed to the first and second support members 211A, 212A. Through this mounting method, it, on the one hand, maintains the sliding rail 22A and the control box 24A in consistency to reduce negative impact from the first and second support members 211A, 212A on the control box 24A (e.g. preventing the first and second support members 211A, 212A from affecting the control box 24A when they are hit by an external force), on the other hand, allows the connection measure between the sliding rails 22A and the control box 24A to be applied to a different structural design of the first and second support members 211A, 212A.

As illustrated in FIG. 15, the control box 24A further comprises a lock 243A. The lock 243A comprises a swivel hook 244A. When locking the lock 243A, the swivel hook 244A rotates backwards and hooks the retaining portion 33A of the battery box 30A, locking the battery box 30A in position to prevent theft.

In installation, the user can mount the brackets 23A to the bottom side of the respective sliding rails 22A, and then fasten the sliding rails 22A to the two opposite lateral sides of the control box 24A through the positioning holes 221A. Thereafter, the user can put the control box 24A and the sliding rails 22A in the accommodation chamber 215A, and then use screws SA to fasten the sliding rails 22A to the first and second support members 211A, 212A. Thus, the sliding rails 22A and the control box 24A are installed. Further, when the user needs to install the battery box 30A into the luggage carrier 20A, the user can hold the recessed handhold 34A of the battery box 30A to move the sliding coupling structures 31A along the respective sliding rails 22A, pushing the battery box 30A into the accommodation chamber 215A till that the terminals 32A are forced into contact with the electric connector 241A. FIG. 14 illustrates the battery box 30A installed in the luggage carrier 20A. If the user needs to replace the battery box 30A, the user only needs to hold the recessed handhold 34A to pull the battery box 30A along the sliding rails 22A. Thus, the procedure of mounting and dismounting the battery box 30A is simple and convenient.

In summary, the present invention provides a structural design of an assembly 10A of a luggage carrier 20A and a battery box 30A that allows the user to install the battery box 30A in the luggage carrier 20A easily without through precision alignment; when requiring replacing the battery box 30A, the user can easily remove the battery box 30 out of the luggage carrier 20A.

Although the embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle mounting mechanism and battery box assembly mounted to a bicycle frame of a bicycle, characterized in that the assembly comprises:
   a battery box comprising a abutment recess and an opening located in an outer surface thereof; and
   a mounting mechanism comprising a locating component unit connected to said bicycle frame and a grip pivotally connected to said locating component unit, said locating component unit comprising an accommodation chamber for detachably accommodating said battery box, said grip comprising an abutment end portion and a push end portion, said abutment end portion being capable of insertion into said accommodation chamber and engaging with said opening with a rotation of said grip, said push end portion being capable of insertion into said accommodation chamber and abutting against said abutment recess with a further rotation of said grip.

2. The bicycle mounting mechanism and battery box assembly as claimed in claim 1 characterized in that, said opening cuts through opposing top and bottom sides of said battery box.

3. The bicycle mounting mechanism and battery box assembly as claimed in claim 1 characterized in that, said grip is rotatable between a close position where said abutment end portion is disposed inside said opening and said push end portion does not touch said abutment recess, and an open position where said abutment end portion is disposed outside said opening and said push end portion contacts said abutment recess.

4. The bicycle mounting mechanism and battery box assembly as claimed in claim 1 characterized in that, said locating component unit further comprises two support members respectively connected to and backwardly extending from a seat tube of said bicycle frame, and a top cover mounted on said two support members; said accommodation chamber is jointly defined by said two support members and said top cover; said grip is pivotally connected to said top cover.

5. The bicycle mounting mechanism and battery box assembly as claimed in claim 4 characterized in that, said top cover comprises a holder block; said grip further comprises a plug hole and a pivot-connection portion pivotally connected to said holder block; said mounting mechanism further comprises a switch device movably mounted on said holder block; said switch device comprises a toggle key and a pin connected to said toggle key; said pin is movable with said toggle key to plug into said plug hole.

6. The bicycle mounting mechanism and battery box assembly as claimed in claim 5 characterized in that, said holder block further comprises a spring mounting groove; said switch device further comprises a compression spring; said compression spring has two opposite ends thereof respectively stopped against said pin and an end wall of said spring mounting groove.

7. The bicycle mounting mechanism and battery box assembly as claimed in claim 6 characterized in that, said assembly further comprises a torsion spring mounted on said pivot-connection portion; said torsion spring comprises two opposing end pieces respectively stopped against said grip and said top cover.

8. The bicycle mounting mechanism and battery box assembly as claimed in claim 5 characterized in that, said assembly further comprises a baffle pivotally connected to said holder block and disposed in front of said grip.

9. The bicycle mounting mechanism and battery box assembly as claimed in claim 2 characterized in that, said grip further comprises a flexible pad mounted on said abutment end portion.

10. The bicycle mounting mechanism and battery box assembly as claimed in claim 5 characterized in that, said grip further comprises a grip body said grip is pivotally connected to said holder block through said pivot-connection portion; said pivot-connection portion is disposed closer to said abutment end portion and said push end portion than said pivot-connection portion is disposed to said grip body.

11. A bicycle luggage carrier and battery box assembly mounted to a seat tube of a bicycle, comprising:
   a luggage carrier comprising a locating component unit and at least one sliding rail, said locating component unit comprising a first support member and a second support member respectively connected to and backwardly extended from said seat tube, said at least one sliding rail being mounted to said locating component unit; and
   a battery box mounted in said locating component unit, said battery box comprising at least one sliding coupling structure respectively slidably coupled to said at least one sliding rail,
   wherein the number of said at least one sliding rail is two, and the two said sliding rails are respectively fastened to an inner wall of said first support member and an inner wall of said second support member, wherein said two sliding rails are respectively and detachably fastened to the said inner wall of said first support member and the said inner wall of said second support member, wherein each said sliding rail comprises a plurality of screw holes; said first support member and said second support member each comprise a plurality of screw holes located on the respective said inner wall thereof and respectively and detachably fastened to the respective said screw holes of said sliding rails with respective screws, and wherein said battery box comprises a set of terminals located at a front side thereof; said luggage carrier further comprises a control box mounted in said locating component unit; said control box comprises an electric connector located at a rear side thereof; said electric connector is electrically connected with said set of terminals when said battery box is mounted in said locating component unit.

12. The assembly as claimed in claim 11, wherein said control box comprises two positioning portions respectively located at two opposite lateral sides thereof; each said sliding rail comprises a positioning hole for fastening one respective said positioning portion of said control box.

13. The assembly as claimed in claim 11, further comprises a lock mounted at said control box for locking said battery box.

\* \* \* \* \*